3,140,190
GRAPHITE BASE CERAMIC REFRACTORY COMPOSITION
John F. Di Lazzaro, Seattle, Wash., assignor to Boeing Airplane Company, Seattle, Wash., a corporation of Delaware
No Drawing. Filed Jan. 23, 1961, Ser. No. 83,884
6 Claims. (Cl. 106—56)

This invention relates to a new and improved class of materials capable of resisting oxidation at high temperatures and possessing refractory properties as well as certain other desirable characteristics. The invention is herein illustratively described by reference to the presently preferred embodiments thereof; however, it will be recognized that certain modifications and changes with respect to details may be made without departing from the essential features involved.

The problem of developing material systems and structural components for use in hypersonic flight vehicles is primarily one of withstanding heat in an oxidizing environment. This invention is directed toward a solution of these and similar problems by providing a class of new materials in the nature of ceramic-graphite compounds which are refractory and are characterized by the inherent formation in an oxidizing high-temperature environment of a self-healing oxidation-protective layer on all exposed surfaces thereof.

These new materials, having a graphite base (i.e., from 30% to 60% by weight), retain many of the desirable characteristics of graphite, such as a high strength-to-weight ratio at high temperatures, capacity to withstand very high temperatures without melting or subliming, thermal and electrical conductivity, low coefficient of friction, and others. In fact, some of these desirable properties of pure graphite are enhanced or magnified in the new graphite-base compositions of this invention and, of greatest significance, the tendency of ordinary graphite and of previously known graphite-base composition to oxidize rapidly at elevated temperatures is overcome herein by the self-forming, self-healing protective coating which develops in an oxidizing atmosphere at high temperatures. Compressed bodies of these new materials exhibit flexural, compressive and tensile strengths at room temperature and at 3000° F., for example, considerably higher than those obtained from presently available graphite bodies. Thermal shock resistance, characteristic of graphite, remains very good in the new graphite-base compositions and the thermal expansion coefficient and bulk density are only slightly higher than with commercial graphite.

With the disclosed compositions, operating temperatures as high as 3300° F. may be withstood for limited periods, whereas temperatures as high as 2600° F. may be withstood on an extended or continuous basis.

This new class of useful high-temperature graphite-base compositions includes, in homogeneous mixture with the graphite, additive materials which, when heated in an oxidizing atmosphere, will develop glassy or glass-like ceramic protective coatings consisting of or primarily comprising a complex mixture of titania and silica. At lower temperatures the coating may also include other additive metal oxides, which volatilize to leave only the titania-silica system as temperature is further increased. The protective coatings are relatively nonporous and strongly adherent to the base material from which they are formed. Such coatings may be produced from compositions comprising a mixture of graphite, molybdenum disilicide and titanium diboride, to name one example from among different available choices. When such a composition is heated in an oxidizing atmosphere, a complex layer of silica and titania forms on the exterior surface which represents substantially pure oxide, with or without some molybdenum oxide and boric oxide, depending upon the temperature achieved and the time during which the composition is subjected to that temperature, during which time the surface by-products molybdenum oxide and boric oxide may evaporate. Certain additives to the composition may be used to impart desired secondary characteristics to the materials if the quantity thereof is limited so as not to impair the glass-like ceramic coating formed thereon. The protective titania and silica surface coatings may be derived from materials other than molybdenum disilicide and titanium diboride, as represented by other examples of materials specified hereinafter.

These and other features, objects and advantages of the invention will become more fully evident from the following description thereof by reference to specific examples and conditions.

The component materials used in this new class of compositions are batched and milled to produce a uniform mixture which will pass through a 200-mesh screen, for example. A liquid binder is then mixed thoroughly with the dry powders. Several binder materials may be used for this purpose, including but not limited to standard coal tar pitch, furfuryl alcohol catalyzed by small additions of mineral or organic acids, phenolics, benzaldehydes, or any of various synthetic or naturally occurring carbonaceous substances. The maximum binder content is preferably slightly less than that required for the binder material to be expressed from the body of material when the latter is being pressed in a molding die. The materials are pressed at pressures ranging from approximately 5,000 pounds per square inch to 15,000 pounds per square inch. The resultant uncured body of compressed material is plastic and fairly strong. The material can, of course, be formed in any of different widely variant shapes.

After the body of material is pressure-formed, it is slowly cured to approximately 300° F. in air. At this point the initially cured material is quite hard due to re-sinification of the furfuryl alcohol or other synthetic or natural solidifiable binder substance. Thereupon the initially cured material is fired in an inert atmosphere to temperatures ranging from 3300° F. to 4000° F. At these elevated temperatures the binder resin first carbonizes and then graphitizes with the basic graphite material in the body. The resultant graphite-base composition is strong structurally and has an initial appearance very similar to that of commercial graphite. It shrinks very little on firing (i.e., approximately 4% linear shrinkage in a representative case).

Typically the graphite constituency is or may be provided conveniently and economically by mixing the necessary quantity of petroleum coke flour or other graphitizable powdery substance with the desired composition additives. The carbonaceous binder adds only slightly to the graphite content of the finished product.

The following are representative examples of compositions comprising the new class of materials of this invention:

| Example No. | Materials* | Weight, percent | Example No. | Materials* | Weight, percent |
|---|---|---|---|---|---|
| 1 | $MoSi_2$ | 25 | 5 (cont.) | $TiB_2$ | 20 |
|   | $TiB_2$ | 25 |   | Graphite | 50 |
|   | Graphite | 50 | 6 | $MoSi_2$ | 25 |
| 2 | $MoSi_2$ | 20 |   | $ZrB_2$ | 10 |
|   | $TiB_2$ | 20 |   | $TiB_2$ | 15 |
|   | Graphite | 60 |   | Graphite | 50 |
| 3 | $MoSi_2$ | 35 | 7 | $MoSi_2$ | 20 |
|   | $TiB_2$ | 35 |   | $ZrB_2$ | 10 |
|   | Graphite | 30 |   | $TiB_2$ | 20 |
| 4 | $MoSi_2$ | 25 |   | Graphite | 50 |
|   | $TiB_2$ | 15 | 8 | $TiSi_2$ | 50 |
|   | $HfB_2$ | 10 |   | Graphite | 50 |
|   | Graphite | 50 | 9 | $MoSi_2$ | 25 |
| 5 | SiC | 10 |   | TiN | 25 |
|   | $MoSi_2$ | 20 |   | Graphite | 50 |

*Plus carbonaceous binder sufficient for forming.

It will be recognized, of course, that the choice of composition mixtures from among those available in the new class, of which the above are only representative, will depend upon the specific properties of the material desired and upon economic factors. Bodies containing a higher graphite content, for example, such as of the order of 70% by volume, gain strength with increasing temperature. Lower graphite content materials lose strength with increasing temperature but still retain greater strength than pure graphite. The room temperature compressive strength of these new graphite-base ceramic bodies is about double that of standard presently available fine grained graphite. Tensile strength also appears to be nearly doubled that of pure graphite. The presence of the ceramic additives in the new compositions causes a somewhat higher coefficient of thermal expansion and bulk density than that of pure graphite. Porosity of the composition (i.e., before it acquires its thermal-oxidation protective coating) varies from about 9% to about 15%.

Despite the higher thermal expansion coefficient of these new compositions, compared with commercial graphite or titanium carbide, for example, they possess extremely good thermal shock resistance due to the graphite matrix. For instance, even after heating the materials to approximately 2600° F. in air and then quenching immediately in water, no deleterious effects were noted, and this proved to be true even after five or more cycles of such heating and quenching of a representative sample. This thermal shock resistance characteristic is of utmost importance in such applications as reentry type hypersonic vehicles which must undergo sudden extensive temperature changes.

Perhaps the most significant property of these new compositions, however, is their capacity to form a self-healing oxidation-resistant coating when heated to elevated temperatures in an oxidizing atmosphere. For example, compositions employing a mixture of graphite, molybdenum disilicide and titanium diboride developed a smooth adherent yellowish-brown layer approximately 0.001 inch thick when heated in air for three hours at 2200° F. Heating for a longer period of time slightly increases the thickness of the coating and renders the same somewhat more refractory. The color changes from yellow to brown with increasing temperatures. The coatings obtained are hard, very adherent and do not crack or spall from the body on cooling. It is found that a thinner coating is formed when the specimens are inserted directly into a heated furnace than when placed in a cold furnace and heated slowly over a period of hours to the same temperature. Because the coating forms quickly and provides an effective seal against diffusion of oxygen into the substrata, very little loss of weight and shrinkage occurs when these compositions are heated to high temperatures in an oxidizing atmosphere. The protective action is due to the formation of a viscous glass-like surface layer after the surface graphite burns off to expose the ceramic additives. When these additives are oxidized there is formed at the very outside surface a layer of pure oxide, which includes a complex of titania and silica, and which is bonded or rooted firmly to the underlying substrata due to the tentacles of ceramic oxide material which emanate down into the body to occupy the pores which are opened as a result of the oxidation of surface graphite. In any case the coating is strongly adherent to the body and, when examined at different levels of depth, graduates from a pure oxide at the very surface to the pure initial composition constituency toward the core. Thus, the coating itself is not regular in thickness but varies due to this phenomenon and tends to increase somewhat in thickness as oxidation time and temperature are increased. However, the coating is highly protective to the body of material insofar as checking oxidation is concerned and is durable as well as self-renewing or self-healing in case it should be scraped off or otherwise damaged.

As the coating is being formed in an oxidizing atmosphere gaseous products are emitted at the surface. In fact, at sufficiently high temperatures these volatile by-products can be seen to bubble up through the viscous ceramic outer layer. Probably, in the first example named, these volatilized by-products are $B_2O_3$, $MoO_3$, CO and $CO_2$ formed by oxidation of the ceramic additives and graphite in the body. To the extent that unvolatilized metal oxides other than titania remain at or near the surface, they may cause a slight degree of porosity. This is tolerable if the percentage is not great, and if its presence is necessary or desirable in order to impart desired secondary characteristics to the material. For instance, if a somewhat harder surface is desired than that afforded by the viscous glassy titania and silica composite, a more refractory material may be added, such as the hafnium (or niobium) additive appearing in Example 4 above. By the same token, some increased erosion resistivity may be achieved by adding silicon carbide as in Example 5, which somewhat hardens the composition. Still it is necessary to limit the amount of silicon carbide added so as to maintain the essentially glass-like nonporous coating formed in an oxidizing atmosphere at high temperature. The presence of zirconium diboride in Examples 6 and 7 also adds to the refractory characteristics of the coating to the extent that zirconium is somewhat more refractory than titanium. However, it is desirable to limit the percentage of zirconium diboride since its presence increases the porosity of the coating and thereby permits to that extent greater rate of air diffusion through the coating and thus more rapid oxidation of the composite body. In Example 8 the source of titania and silica is provided by adding titanium disilicide directly to the graphite base material in the first instance.

In Example 9 the titanium content is supplied by titanium nitride, to nearly the same effect as titanium diboride used in Example 1.

Essentially, then, the invention is characterized by that class of new compositions in which the body of material is composed of a graphite base and certain additives which on heating in an oxidizing atmosphere at high temperatures produce a glassy titania and silica coating which coating renders the body oxidation-resistant and which may or may not include other metal oxides increasing the hardness, erosion resistance, etc., but at the price of somewhat increased porosity which should be limited in order to maintain the essentially nonporous oxidation-resistant, self-healing characteristics of the coating. Even when the temperature is elevated so high that the ceramic oxide coating becomes liquid it affords a substantial degree of oxidation protection to the substrate. That the oxidation-resistant coating is a complex of titania and silica, and is not formed by the molybdenum disilicide itself or by silica alone, is evidenced by the fact, among others, that the silica which forms on molybdenum disilicide, for example, when heated in an oxidizing atmosphere draws up into droplets and does not provide uniform coverage when high oxidizing temperatures are reached, and thus is not protective, whereas the coatings produced with the new compositions of this invention remain uniform and protective at these temperatures.

Of course, the self-healing quality of the coatings which are indefinitely self-regenerating formed out of the basic substrate materials in the new compositions renders the same highly superior to any applied simple coating systems known.

At present the compositions named in the first three examples hereinabove are considered preferable for general applications and from the economic standpoint.

The materials of this invention have a wide variety of applications wherein oxidation resistance at elevated temperatures, retention of structural strength at elevated temperatures, and other characteristics as set forth above are important.

These and other aspects of the invention, including equivalents of the named examples, will be recognized by those skilled in the art.

I claim as my invention:

1. A method of preparing a heat and oxidation-resistant body having the steps of intimately and uniformly blending (1) powdered constituents consisting of a graphite base present in an amount comprising about 30%–60% by weight of said constituents and selected from the group consisting of graphite, coke, and mixtures thereof, and a ceramic additive present in an amount comprising about 70%–40% by weight of said constituents and consisting essentially of molybdenum disilicide and an intermetallic of titanium selected from the group consisting of titanium diboride and titanium nitride, and (2) a liquid carbonaceous binder for the powdered constituents; compressing the blend into a shaped body; and heat treating the body first to resinify the binder and thence to graphitize it to produce a structurally strong composition.

2. A method of preparing a heat and oxidation-resistant body having the steps of intimately and uniformly blending (1) powdered constituents consisting of a graphite base present in an amount comprising about 30%–60% by weight of said constituents and selected from the group consisting of graphite, coke, and mixtures thereof, and a ceramic additive present in an amount comprising about 70%–40% by weight of said constituents and consisting essentially of molybdenum disilicide and titanium diboride, and (2) a liquid carbonaceous binder for the powdered constituents; compressing the blend into a shaped body; and heat treating the body first to resinify the binder and thence to graphitize it to produce a structurally strong composition.

3. A method of preparing a heat and oxidation-resistant body according to claim 2 wherein each of the molybdenum disilicide and the titanium diboride is present in an amount comprising about 15%–35% by weight of said constituents.

4. A method of preparing a heat and oxidation-resistant body according to claim 2 wherein the ceramic additive also contains up to 10% by weight of said constituents of hafnium diboride.

5. A method of preparing a heat and oxidation-resistant body according to claim 2 wherein the ceramic additive also contains up to 10% by weight of said constituents of zirconium diboride.

6. A method of preparing a heat and oxidation-resistant body according to claim 2 wherein the ceramic additive also contains up to 10% by weight of said constituents of silicon carbide.

References Cited in the file of this patent

UNITED STATES PATENTS

| | | |
|---|---|---|
| 2,013,625 | Buck | Sept. 3, 1935 |
| 3,003,860 | Sermon et al. | Oct. 10, 1961 |
| 3,037,756 | Ornitz | June 5, 1962 |
| 3,065,088 | Janes et al. | Nov. 20, 1962 |